United States Patent [19]

O'Donnell et al.

[11] 3,717,853

[45] Feb. 20, 1973

[54] MAGNETIC BUBBLE DOMAIN SYSTEM

[75] Inventors: Cedric F. O'Donnell, Fullerton; George R. Pulliam, Anaheim, both of Calif.

[73] Assignee: North American Rockwell Corporation

[22] Filed: April 1, 1971

[21] Appl. No.: 130,130

[52] U.S. Cl.....340/174 TF, 340/174 M, 340/174 VA
[51] Int. Cl. ..............................................G11c 11/14
[58] Field of Search ..................340/174 TF, 174 VA

[56] References Cited

UNITED STATES PATENTS 3,540,019 11/1970 Bobeck et al...................340/174 TF

OTHER PUBLICATIONS

IBM Technical Disclosure Bulletin, Vol. 13, No. 9, Feb. 1971, pg. 2623.

*Primary Examiner*—James W. Moffitt
*Attorney*—L. Lee Humphries, H. Fredrick Hamann and Joseph E. Kieninger

[57] ABSTRACT

A magnetic bubble domain system having localized areas of bubble domain spatial stability of a particular shape which have a preferred unidirectional movement for bubble domains is disclosed. The bubble domain system includes a thin film of single crystal magnetic bubble domain material on a single crystal substrate. The film has a plurality of isolated thick portions with a truncated shape surrounded by relatively thin regions which serve as energy barriers to the movement of bubble domains and which confine the bubble domains in the relatively thick portions. The truncated shaped thick portions have a narrow end and a wide end. Moving a bubble domain from the wide end of one thick portion to the narrow end of another portion takes place along the preferred "easy" movement direction. Moving a bubble domain along the "hard" movement direction from the narrow end of one portion to the wide end of another thick portion requires a larger force than along the easy movement direction.

3 Claims, 3 Drawing Figures

INVENTORS
GEORGE R. PULLIAM
CEDRIC F. O'DONNELL
BY
Joseph E. Kieninger
ATTORNEY

MAGNETIC BUBBLE DOMAIN SYSTEM

FIELD OF THE INVENTION

This invention relates to magnetic bubble domain systems and more particularly to the shape of localized areas having bubble domain spatial stability.

BRIEF DESCRIPTION OF PRIOR ART

Magnetic domains and the propagation thereof in a magnetic medium are well known in the art and are described in U.S. Pat. Nos. 3,460,116; 3,470,546; 3,508,225; and others. In general, these patents describe the movement of single wall bubble domains in a shift register by the use of narrow metal patterns to control the positions of the bubbles. The methods described in these patents attempt to minimize the repulsive or interaction forces between the individual bubbles by separating the individual bubbles from each other by a distance which is about three or more bubble domain diameters. These methods try to substantially eliminate or minimize as much as possible the interaction forces between bubbles.

In a copending application to David Heinz, Ser. No. 81,232, filed Oct. 16, 1970 assigned to the Assignee of the present invention, a magnetic bubble domain system comprising one or more channels or strips of magnetic bubble domain material on a supporting substrate is described. Any number of individual magnetic bubble domain channels may be interconnected or connected to a main channel. The movement of bubble domains along a channel or strip is affected by the repulsive or reaction forces between bubble domains which are present in a channel when a bubble domain is formed or propagated near another bubble domain. The movement of bubbles from a given channel into one of several possible adjoining channels to form a logic function may be directed by the presence or absence of bubbles in one or more connecting channels. This application is incorporated herewith by reference thereto.

Another patent application assigned to the Assignee of the present invention, Ser. No. 123,644, filed Mar. 12, 1971, to Owens et al, describes a magnetic bubble domain system having bubble domains located in specific equilibrium positions in a strip or channel of magnetic bubble domain material film associated with the supporting substrate. The strip has at least one restricted portion therein which determines the position of a bubble domain in a nonrestricted strip portion associated therewith. The position or location of bubble domains in a strip of bubble domain film is predetermined by the proper spacing of restrictive strip portions. This application is incorporated herewith by reference thereto.

In another copending application to Pulliam et al, Ser. No. 130,128, filed Apr. 1, 1971, assigned to the Assignee of the present invention, a magnetic bubble domain system having localized areas of spatial stability for bubble domains is disclosed. The bubble domain system includes a thin film of single crystal magnetic bubble domain material on a single crystal substrate wherein the film has a plurality of isolated thick portions surrounded by thin regions. The bubble domains when formed preferentially move into the thick portions. The surrounding relatively thin regions of film serve as energy barriers to the movement of bubble domains and confine the bubble domains in the relatively thick portions of the film. Bubble domains may be moved to and from the thick portions in a plurality of directions.

In the bubble domain system described in Ser. No. 130,128, filed Apr. 1, 1971, the bubble domains may be readily moved in a plurality of directions with substantially the same ease of movement. A bubble domain may be moved as easily from a thick portion A to a thick portion B as easily as from thick portion B to thick portion A. In certain applications, it is desirable to have a preferred direction of movement, that is, to have it easier to move from portion A to portion B than from portion B to portion A.

SUMMARY OF THE INVENTION

It is an object of this invention to provide an improved magnetic bubble domain system.

It is another object of this invention to provide a magnetic bubble domain system having localized areas of bubble domains spatial stability which have a preferred unidirectional movement for bubble domains.

These and other objects of this invention are realized by a magnetic bubble domain system having a thin film of single crystal magnetic bubble domain material on a single crystal substrate. The film has a plurality of isolated thick portions with a truncated shape surrounded by thinner regions. The thick portions have a truncated shape defined by a wide end and a narrow end. Bubble domains positioned in the thick portions may be moved by conventional means to nearby thick portions. Bubble domains move in the easy movement direction from the wide end of one thick portion to the narrow end of another thick portion. Bubble domains in the hard movement direction move from the narrow end of a thick portion to the wide end of another thick portion. Bubble domains require less force to move in the easy movement direction than in the hard movement direction thereby resulting in a bubble domain system having a preferred unidirectional bubble domain movement pattern.

Other objects and advantages of this invention will be apparent from the following detailed description wherein a preferred embodiment of the present invention is clearly shown.

DESCRIPTION OF AN ILLUSTRATIVE EMBODIMENT

In general, this invention describes a magnetic bubble domain system involving a plurality of truncated shaped relatively thick portions of thin film single crystal bubble domain material on a supporting single crystal substrate which are surrounded by regions of film having a thickness less than the thickness of the portions. The bubble domains preferentially position themselves in the thick portions of the film which have a lower energy level than the relatively thin regions of the film.

External force is applied by conventional methods to move a bubble domain from one thick portion to another thick portion of the film. While a bubble domain may be moved in any direction from one thick portion to another thick portion, the truncated shape of the thick portions provides a unidirectional movement of the bubble domain which is preferred. The preferred direction is the easy movement direction from the wide end of one thick portion to the narrow end of another thick portion. At the same time, a substantially larger external force is required to move a bubble domain in the hard direction, that is, from the narrow end of a thick portion to the wide end of another thick portion.

Figure 2:
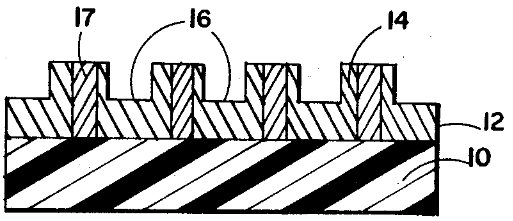
FIG. 2 is a cross-sectional view of the structure of FIG. 1.
Figure 1:
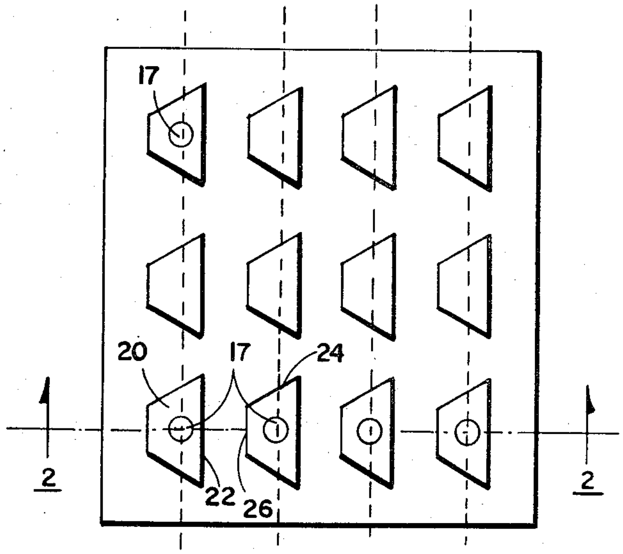
FIG. 1 is a top view showing the truncated thick film portions surrounded by thin film regions.

As shown in FIGS. 1 and 2, a monocrystalline substrate 10 is subjected to a chemical vapor deposition step to provide a thin film 12 of magnetic bubble domain material. The film 12 is subsequently etched to provide a plurality of relatively thick portions 14 surrounded by a relatively thin region 16. A region 16 has a thickness less than the thickness of the portions 14. Portions 14 have a truncated shape with one wide end and one narrow end and will be hereinafter fully discussed. The relatively thick portions 14 are isolated from each other by relatively thin regions 16 and appear as islands in the film 12.

The deposition step is carried out in accordance with the copending patent application, Ser. No. 833,268, filed June 16, 1969, by Mee et al, and assigned to the Assignee of the present invention. This patent application is incorporated herewith by reference thereto.

The substrate 10 preferably a monocrystalline garnet having a $J_3Q_5O_{12}$ formulation wherein the J constituent of the wafer formulation is at least one element selected from the group consisting of cerium, praseodymium, neodymium, promethium, samarium, europium, gadolinium, terbium, dysprosium, holmium, erbium, thulium, ytterbium, lutetium, lanthanum, yttrium, calcium, and bismuth; and the Q constituent of the wafer formulation is at least one element from the group consisting of indium, gallium, scandium, titanium, vanadium, chromium, manganese, rhodium, zirconium, hafnium, niobium, tantalum, aluminum, phosphorus, arsenic and antimony.

Examples of suitable substrate materials are $Y_{0.45}$, $Gd_{2.55}$, $Ga_5O_{12}$, $Dy_{0.65}Gd_{2.35}Ga_5O_{12}$ and $Sm_3Ga_5O_{12}$.

The film strip or channel 12 of bubble domain material is, preferably, a single crystal garnet having a $J_3Q_5O_{12}$ formulation wherein the J constituent of the film formulation has at least one element selected from the group of cerium, praseodymium, neodymium, promethium, samarium, europium, gadolinium, terbium, dysprosium, holmium, erbium, thulium, ytterbium, lutetium, lanthanum, and yttrium; the Q constituent of the film formulation is taken from the group consisting of iron, iron and aluminum, iron and gallium, iron and indium, iron and scandium, iron and titanium, iron and vanadium, iron and chromium, and iron and manganese.

Preferred film materials are iron garnets such as $Y_3Ga_{1.2}Fe_{3.8}O_{12}$ and $Tb_3Fe_5O_{12}$.

The composite iron garnet film-substrate structure has a film with a given magnetostriction constant and a given difference between the lattice constants of the film and substrate. This requirement is discussed in detail in the copending patent applications Ser. Nos. 101,785, 101,786, and 101,787, all filed Dec. 28, 1970 by Mee et al, which are incorporated herewith by reference thereto.

While garnets are the preferred materials for the substrate thin film, other oxide materials may be used for the substrate, especially when the film is formed of an orthoferrite material.

The truncated shaped portions 14 are formed preferably by an etchant step using photolithographic etching techniques of the type commonly used in the semiconductor industry and by employing an etchant such as hot phosphoric acid. The hot phosphoric acid in this case would etch the mask-free areas of film 12 to form the relatively thin regions 16. The masked portion of the film 12 which is not etched becomes the relative thick portions 14. While chemical etching is the preferred manner of forming the portions 14, other methods such as sputter etching, laser machining and the like may be used.

The size of the truncated shaped portions 14 is not critical in the practice of this invention. However, it is understood that the size of the portion 14 would be greater than the size of the bubble domains formed in the particular film. For example, bubble domains in substituted iron garnet have a diameter of the order of about 0.0003 inches. In this case, the length of the narrow end 26 of the portion 14 should be of the order of 0.001 inches or greater. This invention is not limited to portions 14 having a size which is sufficient to confine only one bubble domain. That is, if desired, portion 14 may contain a plurality of bubble domains. Preferably, in many applications, it would be desirable for portion 14 to be of a size large enough to conveniently contain one bubble domain therein.

Bubble domains 17 are formed in the conventional manner by applying the appropriate magnetic field over the structure shown in FIGS 1 and 2. Bubble domains 17 may be formed in only one portion 14 or they may be formed in a plurality of portions 14. The bubble domain 17 that is formed in the film 12 will be positioned in the thick portion 14 because the energy level in portion 14 is lower than in the thinner surrounding region 16. The surrounding region 16, having a higher energy level, acts as a restraining barrier to the movement of bubble domains from one thick portion to another.

The truncated shaped portion 14 may be arranged in rows and/or in columns as shown in FIG. 1. The truncated portions 14 have a narrow end 26 and a wide end 22. The truncated shaped portions 14 are arranged preferably in a symmetrical pattern, that is, so that a wide end from one thick portion 14 is next to a narrow end of an adjacent portion 14. For example, the wide end 22 of truncated shaped portion 20 is next to narrow end 26 of adjacent truncated shaped portion 24.

The truncated shaped portion 14 may be arranged with the narrow end aligned to face the westernly direction as shown in FIG. 1 as well as aligned to face in the northernly, easternly, southernly directions or combinations thereof. For example, one row may have the narrow ends 26 facing in an easternly direction and a second row facing in a westernly direction.

Figure 3:
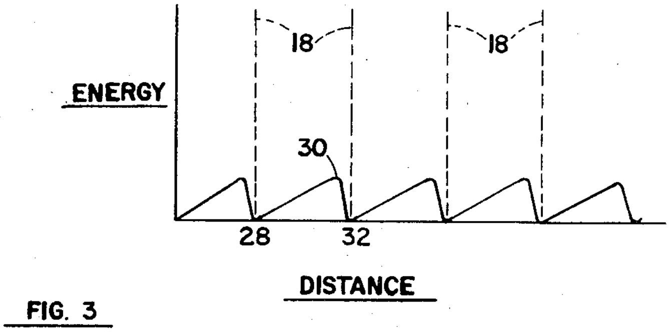
FIG. 3 is a curve showing the energy-distance relationship for the movement of a bubble domain between the thick film portions.

The bubble domain 17 position themselves in truncated shaped portion 14 in the minimum energy position 18 as shown in FIGS 1 and as depicted in FIG. 3. Bubble domains may be moved to and from adjacent portions 14. For example, a bubble domain is moved along the easy movement direction through the wide end 22 of truncated shaped portion 20 through the narrow end 26 of truncated portion 24. This direction between truncated portions is referred to as the easy movement direction because a relatively small force is required for bubble domain movement. In accordance with this invention, the preferred direction for bubble domain movements is in the easy movement direction. By properly selecting the size of the external force, bubble domain movement will be unidirectional in the easy direction since movement in other directions would require a larger force. The force required is defined by the change in energy per change in distance ($F = dE/dX$). The force required for bubble domain movement is illustrated in FIG. 3 as the slope ($dE/dX$) of the energy-distance curve. The force, that is, slope from 28 to 30 is smaller for movement along the easy direction from portion 20 to portion 24 than the slope from 32 to 30 for movement along the hard direction from portion 24 to portion 20.

The easy movement direction can be designed to go in any direction by proper alignment of the truncated shapes. The use of truncated shapes and the movement of the bubbles along the easy movement direction provides a unidirectional path for the bubble domains. Bubble domains may be moved along the hard movement direction, although the preferred direction which requires a smaller force would be along the easy movement direction.

We claim:

1. A magnetic bubble domain system having localized areas of bubble domain stability adapted to provide a unidirectional preferred movement for bubble domains comprising a substrate, a thin film of magnetic bubble domain material on said substrate, a first portion of said film having a first thickness, said first portion having a truncated shape including a narrow end and a wide end, said first portion being surrounded by a first region of said film having a thickness less than said first portion, and a second portion of said film having a second thickness, said second portion having a truncated shape including a narrow end and a wide end, said second portion being surrounded by a second region of film having a thickness less than said second portion, said second portion being in spaced relation with said first portion wherein a bubble domain may be moved from said first portion through said wide end of said first portion to said second portion through said narrow end of said second portion.

2. A magnetic bubble domain system having localized areas of spatial stability adapted to provide a unidirectional preferred movement for bubble domains comprising a substrate, a thin film of mangetic bubble domain magnetic on said substrate, a first portion of said film having a first thickness, said first portion having a truncated shape including a narrow end and a wide end, said first portion being surrounded by a first region of said film having a thickness less than said first portion, and a plurality of portions of said film having a second thickness, said plurality of portions each having a truncated shape including a narrow end and a wide end, said plurality of portions being surrounded each by a region of said film having a thickness less than said plurality of portions, said plurality of portions being in spaced linear relation with said first portion wherein said narrow ends are uniformly and symmetrically spaced from each other.

3. A method of providing a unidirectional bubble domain movement in a bubble domain system having localized areas of bubble domain spatial stability comprising the steps of forming a plurality of distinct thick bubble domain material film portions in a linear symmetrical spaced relationship having a truncated shape and which are surrounded by a region of film material having a thickness less than said portions whereby bubble domains move more readily in one direction.

* * * * *